United States Patent Office 3,491,168
Patented Jan. 20, 1970

3,491,168
COMPOSITIONS COMPRISING EPDM RUBBER AND ALKENE OXIDE POLYMER
James N. Short and Henry L. Hsieh, Bartlesville, Okla., assignors to Phillips Petroleum Company, a corporation of Delaware
No Drawing. Filed Feb. 7, 1968, Ser. No. 703,559
Int. Cl. C08f 29/10; C08g 43/02
U.S. Cl. 260—897     5 Claims

ABSTRACT OF THE DISCLOSURE

Vulcanizates possessing high tear strength are prepared from blends of ethylene/propylene/diene rubber (EPDM) and rubber prepared from alkene oxides and one or more monomers which will impart olefinic unsaturation to the polymer molecule.

BACKGROUND OF THE INVENTION

EPDM rubbers—vulcanizable ethylene/propylene/diene rubbers such as a terpolymer of ethylene, propylene and a third monomer which imparts olefinic unsaturation to the polymer—while exhibiting many properties desirable in the art are deficient in tear strength.

Tear strength is of particular importance when the rubber is utilized in tire production, fabrication of conveyor belts or other applications where the strength of the material is an important factor in determining the value of the ultimate product derived from the rubbery material.

THE INVENTION

We have now discovered that the deficiency in tear strength of EPDM rubbers is overcome by blending with the EPDM rubbers a rubber containing unsaturation which is prepared by the copolymerization of two or more alkene oxides, at least one of which contains olefinic unsaturation.

It is thus an object of the present invention to provide novel compositions of EPDM rubbers having improved tear strength.

Other aspects, objects and the several advantages of this invention will be apparent to those skilled in the art upon consideration of this disclosure.

The EPDM rubbers employed in this invention are sulfur vulcanizable amorphous terpolymers prepared by the copolymerization of ethylene, propylene, and a termonomer capable of introducing unsaturation into the polymer molecule. They can be prepared by any method known to the art. Termonomers utilized to impart sulfur vulcanizability include dicyclopentadiene, 1,4-pentadiene, 1,4-hexadiene, 1,5 - hexadiene, 2 - methyl - 1,5-hexadiene, 3, 3-dimethyl - 1,5 - hexadiene, 1,7 - octadiene, 1,9-decadiene, 5 - ethylidene - 2 - norbornene, and certain of the fulvene class of compounds such as 6,6-dimethylfulvene, 6,6-diethylfulvene, and the like.

Vulcanizable alkene oxide rubbers include copolymers and terpolymers of alkene oxides in which at least one of the monomers contains olefinic unsaturation. Unsaturated alkene oxides which impart sulfur vulcanizability to these rubbers are compounds which generally contain from 4 to 10 carbon atoms per molecule and include butadiene monoxide (1,2 - epoxy - 3 - butene), 1,2 - epoxy-3 - pentene, 1,2 - epoxy - 5 - hexene, 1,2 - epoxy-4-ethyl-3-hexene, 1,2 - epoxy - 2,4,6 - trimethyl 6 - octene, allyl glycidyl ether (2,3 - epoxypropyl - 2 - propenyl ether), 2,3 - epoxypropyl 3-butenyl ether, and the like. Examples of alkene oxide rubbers that can be employed include the following: copolymer of epichlorohydrin and allyl glycidyl ether; copolymer of propylene oxide and allyl glycidyl ether; terpolymer of epichlorohydrin, propylene oxide and allyl glycidyl ether; terpolymer of epichlorohydrin, ethylene oxide, and allyl glycidyl ether; copolymer of butadiene monoxide and 1,2-epoxypentane; terpolymer of propylene oxide, epichlorhydrin, and 1,2-epoxy-5-hexene; and terpolymer of epichlorohydrin, butadiene monoxide, and allyl glycidyl ether.

The vulcanizable alkene oxide rubber is employed in amounts that are generally in the range of 5 to 70, preferably 10 to 50, parts by weight per 100 parts by weight of the total polymeric material in the composition. The amount is determined by the particular alkene oxide rubber selected and the properties desired in the vulcanized polymer composition.

The improvement in tear strength of ethylene/propylene/diene rubber achieved by blending therewith a sulfur vulcanizable alkene oxide rubber is advantageous when the rubber is utilized in tire production, fabrication of conveyor belts, and other applications where tear strength is an important factor.

The blends of the invention can be formed by any means known in the art such as by blending on a mill or in an internal mixture.

Compounding ingredients such as carbon black and ether fillers, vulcanizing agents, vulcanizer accelerators, antioxides, pigments, dyes, plasticizers, extenders, and the like can be added to the blends in keeping with the scope of the invention.

The following examples will further illustrate the invention,

EXAMPLE I

The effect of a rubbery epichlorohydrin/ethylene oxide/allyl glycidyl ether terpolymer and also a rubbery propylene oxide/allyl glycidyl ether copolymer on the tear strength of a rubbery ethylene/propylene/1,4-hexadiene terpolymer was determined by preparing blends of the rubbers and comparing the tear strength with that of the ethylene/propylene/1,4-hexadiene terpolymer. The blends were prepared by mixing the components on a 4-inch-diameter roll mill at 158° F. and were then remilled once at 125° F. Each composition was compounded and cured 30 minutes at 307° F. and tear strength determined. Data are presented in Table I.

TABLE I
Compounding Recipe, Parts by Weight

| | 1 | 2 | 3 | 4 |
|---|---|---|---|---|
| Ethylene/propylene/1,4-hexadiene rubber [1] | 75 | 75 | 100 | |
| Epichlorohydrin/ethylene oxide/allyl glycidyl ether rubber [2] | 25 | | | |
| Propylene oxide/allyl glycidyl ether rubber [3] | | 25 | | 100 |
| High abrasion furnace black | 50 | 50 | 50 | 50 |
| 2,2'-methylene-bis(4-methyl-6-tert-butylphenol) | 0.5 | 0.5 | 0.5 | 0.5 |
| Circosol 2XH [4] | 10 | 10 | 10 | 10 |
| Stearic acid | 2 | 2 | 2 | 2 |
| Sulfur | 1.5 | 1.5 | 1.5 | 1.5 |
| Tetramethylthiuram monosulfide | 1.5 | 1.5 | 1.5 | 1.5 |
| 2-mercaptobenzothiazole | 0.5 | 0.5 | 0.5 | 0.5 |
| Zinc oxide | 5 | 5 | 5 | 5 |
| Cured 30 Minutes at 307° F. | | | | |
| Tear strength, lbs./inch at 200° F.[5] | 220 | 230 | 55 | 30 |

[1] DuPont product; ML–4 at 212° F., 85; weight percent propylene, 48; inherent viscosity, 2.4; percent toluene insolubles, 6.
[2] Monomer weight ratio, 70/22/8.
[3] A product of General Tire and Rubber Company.
[4] Petroleum hydrocarbon softener containing hydrocarbons of high molecular weight; viscous, transparent, pale green, odorless liquid of low volatility; sp. gr. 0.940; Saybolt Universal viscosity at 100° F., about 2,000 seconds.
[5] ASTM D-624-54, Die A, Crescent tear.

These data show that the tear strength of the vulcanizates was much better for the compositions prepared according to the invention than it was for either the ethylene/propylene/1,4-hexadiene rubber or the alkene oxide copolymer alone.

EXAMPLE II

A further series of compositions showing the effect of a rubbery epichlorohydrin/ethylene oxide/ally glycidyl ether terpolymer and a rubbery propylene oxide/allyl glycidyl ether copolymer on the tear strength of ethylene/propylene/1,4-hexadiene rubber (EPDM) were prepared by forming blends of the various rubber materials and comparing the tear strength thereof with a composition containing only the individual rubber component or varying amounts of the components. Each composition was compounded in accordance with the recipe of Example I and cured 30 minutes at 307° F. and the tear strength thereafter determined. The data obtained are set forth in Table II.

TABLE II

Parts, by Weight

| Run No. | EPDM a | Alkene Oxide | | Tear Strength at 200° F., lb./in.d |
|---|---|---|---|---|
| | | Copolymer b | Terpolymer c | |
| 1 (control) | 100 | | | 60 |
| 2 | 90 | 10 | | 75 |
| 3 | 75 | 25 | | 230 |
| 4 | 50 | 50 | | 190 |
| 5 | 25 | 75 | | 60 |
| 6 | 10 | 90 | | 50 |
| 7 (control) | | 100 | | 40 |
| 8 | 90 | | 10 | 65 |
| 9 | 75 | | 25 | 180 |
| 10 | 50 | | 50 | 225 |
| 11 | 25 | | 75 | 55 |
| 12 | 10 | | 90 | 60 |
| 13 (control) | | | 100 | 60 | a DuPont product; ethylene/propylene/1,4-hexadiene rubbery polymer; ML-4 at 212° F., 85; weight percent propylene, 48; inherent viscosity, 2.4; percent toluene insolubles, 6.
b General Tire and Rubber Company product; propylene oxide/allyl glycidyl ether rubbery polymer.
c Epichlorohydrin/ethylene oxide/allyl glycidyl ether rubbery polymer of 70/24/6 monomer weight ratio.
d ASTM D-624-54, Die A, Crescent tear.

These data clearly demonstrate that addition of the alkene oxide rubber to the EPDM rubber significantly and unexpectedly increases the tear strength of the vulcanizes therefrom. More specifically the data show that combining with the EPDM rubber (tear strength 60 p.s.i.—Run 1) an alkene oxide rubber (tear strength 40 p.s.i.—Run 7 or 60 p.s.i.—Run 13) results in a totally unexpected increase in the tear strength of the resulting blends thereof.

Reasonable variations and modifications of the invention can be made, as followed, in view of the foregoing disclosure, without departing from the spirit or scope thereof.

We claim:
1. A vulcanizable rubber composition comprising from 95 to 30 parts by weight per 100 parts by weight of total polymer composition of an ethylene/propylene/diene terpolymer prepared by the copolymerization of ethylene, propylene and a termonomer selected from the group consisting of dicyclo-pentadiene, 1,4-pentadiene, 1-4, hexadiene, 1,5-hexadiene, 2-methyl - 1,5 - hexadiene, 3,3-dimethyl-1,5-hexadiene, 1,7-octadiene, 1,9-decadiene, 5-ethylidene-2-norbornene, 6,6 - dimethylfulvene and 6,6-diethylfulvene, and from 5 to 70 parts by weight per 100 parts by weight of total polymer of an alkene oxide rubber selected from the group consisting of the copolymer of epichlorohydrin and allyl glycidyl ether, the copolymer of propylene oxide and allyl glycidyl ether, terpolymer of epichlorohydrin, propylene oxide and allyl glycidyl ether, the terpolymer of epichlorohydrin, ethylene oxide and allyl glycidyl ether, the copolymer of butadiene monoxide and 1,2-epoxy pentane, the terpolymer of propylene oxide, epichlorohydrin and 1,2-epoxy-5-hexene and the terpolymer of epichlorohydrin, butadiene monoxide and allyl glycidyl ether.

2. A composition according to claim 1 wherein said ethylene/propylene/diene rubber is ethylene/propylene/1,4-hexadiene rubber and said alkene oxide rubber is epichlorohydrin/ethylene oxide/allyl glycidyl ether rubber.

3. A composition according to claim 1 wherein said ethylene/propylene/diene rubber is ethylene/propylene/1,4-hexadiene rubber and said alkene oxide rubber is propylene oxide/allyl glycidyl ether rubber.

4. A composition according to claim 2 wherein said ethylene/propylene/diene rubber is an ethylene/propylene/1,4-hexadiene rubber having 48 weight percent propylene, a Mooney viscosity at 212° F. of 85 and an inherent viscosity of 2.4, and said alkene oxide rubber is epichlorohydrin/ethylene oxide/allyl glycidyl ether rubber having a monomer weight ratio of 70/22/8.

5. A composition according to claim 2 wherein said ethylene/propylene/diene is an ethylene/propylene/1,4-hexadiene rubber having 48 weight percent propylene, a Mooney viscosity at 212° F. of 85 and an inherent viscosity of 2.4, and said alkene oxide rubber is a propylene oxide/allyl glycidyl ether rubber copolymer.

References Cited
UNITED STATES PATENTS

| 3,373,078 | 3/1968 | Ferrington | 161—217 |
| 3,297,598 | 1/1967 | Mills | 260—3 |
| 3,285,804 | 11/1966 | Robinson | 161—239 |
| 3,135,705 | 6/1964 | Vandenberg | 260—2 |
| 2,933,480 | 4/1960 | Gresham et al. | 260—80.5 |

MURRAY, TILLMAN, Primary Examiner

C. J. SECCURO, Assistant Examiner

U.S. Cl. X.R.
260—79.5, 889